US012777564B2

(12) United States Patent
Kwack et al.

(10) Patent No.: US 12,777,564 B2
(45) Date of Patent: Oct. 27, 2026

(54) COOKING APPLIANCE

(71) Applicant: LG ELECTRONICS INC., Seoul (KR)

(72) Inventors: Younghwan Kwack, Seoul (KR); Seongho Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 740 days.

(21) Appl. No.: 18/142,826

(22) Filed: May 3, 2023

(65) Prior Publication Data

US 2023/0363061 A1 Nov. 9, 2023

(30) Foreign Application Priority Data

May 4, 2022 (KR) ........................ 10-2022-0055227

(51) Int. Cl.
*H05B 6/12* (2006.01)
*H05B 6/06* (2006.01)

(52) U.S. Cl.
CPC ........... *H05B 6/1272* (2013.01); *H05B 6/062* (2013.01); *H05B 2206/022* (2013.01)

(58) Field of Classification Search
CPC .... H05B 6/1245; H05B 6/1272; H05B 6/062; H05B 2206/022
See application file for complete search history.

(56) References Cited

U.S. PATENT DOCUMENTS

| | | | | |
|---|---|---|---|---|
| 2017/0142783 | A1* | 5/2017 | Herzog | H05B 6/1254 |
| 2021/0259060 | A1 | 8/2021 | Kwack et al. | |
| 2022/0159794 | A1* | 5/2022 | Bilgin | H05B 6/1245 |

FOREIGN PATENT DOCUMENTS

| | | | | | |
|---|---|---|---|---|---|
| DE | 10127051 | A1 | * | 12/2002 | H05B 6/1245 |
| EP | 3 869 912 | A1 | | 8/2021 | |
| JP | 2008293888 | A | * | 12/2008 | H05B 6/1245 |
| JP | 4845432 | B2 | | 12/2011 | |
| KR | 101261510 | B1 | * | 5/2013 | H05B 6/1209 |
| WO | WO-2020182314 | A1 | * | 9/2020 | H05B 6/1245 |

* cited by examiner

*Primary Examiner* — Thien S Tran
(74) *Attorney, Agent, or Firm* — Birch, Stewart, Kolasch & Birch, LLP

(57) ABSTRACT

A cooking appliance includes a coil height adjustor configured to adjust a height of a working coil or a plurality of working coils located at different height and an inverter configured to control the current flow through the working coil or at least one working coil of the plurality of working coils.

12 Claims, 8 Drawing Sheets

COOKING APPLIANCE

CROSS-REFERENCE TO RELATED APPLICATION

This non-provisional application claims the benefit under 35 U.S.C. § 119(a) to Patent Application No. 10-2022-0055227, filed in the Republic of Korea on May 4, 2022, all of which is hereby expressly incorporated by reference into the present application.

TECHNICAL FIELD

The present disclosure relates to a cooking appliance. More specifically, the present disclosure relates to a coil height controller of a cooking appliance that heats both a magnetic material and a non-magnetic material, and a plurality of working coils disposed at different positions.

BACKGROUND ART

Various types of cooking appliances are used to heat food in homes or restaurants. In the past, gas stoves using gas as a fuel have been widely spread and used. However, in recent years, devices for heating an object to be heated, for example, a cooking container such as a pot, by using electricity without using gas have been widely spread.

A method for heating an object to be heated by using electricity is largely divided into a resistance heating method and an induction heating method. The resistance heating method is a method for heating an object to be heated by transferring heat, which is generated when a current flows through a metal resistance wire or a non-metal heating element such as silicon carbide, to the object to be heated (e.g., a cooking container) through radiation or conduction. The induction heating method is a method for heating an object to be heated itself by generating an eddy current in the object to be heated made of a metal component by using magnetic field generated around a coil when predetermined radio frequency power is applied to the coil.

In recent years, the induction heating method is mostly applied to a cooking appliance.

Meanwhile, such cooking appliance has a limitation in that the heating efficiency when heating the non-magnetic vessel is very low compared to the heating efficiency when heating the magnetic vessel.

In the case of the cooking appliance to which an induction heating method is applied, in order to solve the problem of very low heating efficiency for non-magnetic substance (e.g., heat-resistant glass, pottery, etc.), the cooking appliance may include an intermediate heating element. The cooking appliance can heat the non-magnetic substance by using the intermediate heating element.

However, when the cooking appliance includes an intermediate heating element, when heating the magnetic substance, since a portion of the magnetic field generated from the working coil couple to the intermediate heating element to indirectly heat the object to be heated, the heating efficiency is decreased compared to heating the object to be heated directly. Furthermore, in cases where the working coil is positioned close to the object to be heated to increase the heating efficiency of magnetic substance, the working coil is also positioned close to the intermediate heating element, causing a problem where the magnetic field excessively couples with the intermediate heating element and damages the working coil during heating of the non-ferromagnetic object.

DISCLOSURE

Technical Problem

The present disclosure provides a cooking appliance capable of heating all of magnetic, non-magnetic, and non-metallic vessels regardless of the material of the vessel.

The present disclosure provides a cooking appliance including an intermediate heating element that can minimize a problem in that the heating efficiency of a magnetic vessel decreases due to the coupling of a magnetic field to the intermediate heating element.

The present disclosure provides a cooking appliance including an intermediate heating element that can minimize a problem in that the working coil is damaged by the heat from the intermediate heating element.

Technical Solution

According to an embodiment of the present disclosure, a cooking appliance includes an upper plate for placing an object to be heated, an intermediate heating element installed on the upper plate, a working coil for generating a magnetic field passing through at least one of the objects to be heated and the intermediate heating element, an inverter for controlling the current flowing through the working coil and a coil height controller for adjusting a height of the working coil.

According to an embodiment of the present disclosure, a coil height controller adjusts the height of a working coil differently based on a type of an object to be heated.

According to an embodiment of the present disclosure, a coil height controller adjusts the distance between a working coil and an object to be heated.

According to an embodiment of the present disclosure, a coil height controller adjusts the distance between a working coil and an intermediate heating element.

According to an embodiment of the present disclosure, a cooking appliance includes a motor transmitting power to a coil height controller.

According to an embodiment of the present disclosure, a horizontal cross section of an intermediate heating element is a shape having at least one closed loop.

According to an embodiment of the present disclosure, a coil height controller adjusts a height of a working coil to a first height when an object to be heated is a magnetic substance, and adjusts the height of the working coil to a second height lower than the first height when the object to be heated is a non-magnetic substance.

According to an embodiment of the present disclosure, a coil height controller comprises a supporter supporting a working coil and an elevator elevating the supporter.

According to an embodiment of the present disclosure, an elevator provides a supporting leg combined to a supporter and an accommodation groove formed inside the lower end of the supporting leg in which an elastic element is accommodated, and the elevator includes a support end installed on the lower side of the supporting leg to support the supporting leg.

According to an embodiment of the present disclosure, a cooking appliance includes an upper plate on which an object to be heated is placed, an intermediate heating element installed on the upper plate, a first working coil and a second working coil configured generating a magnetic field passing through at least one of the object to be heated and the intermediate heating element, an inverter configured to control the current to flow through at least one of the first working coil and the second working coil and the first working coil and the second working coil are disposed to be place at the different height.

According to an embodiment of the present disclosure, a diameter of a first working coil is a first length, and a diameter of a second working coil is a second length greater than the first length.

According to an embodiment of the present disclosure, an opening through which at least a portion of a magnetic field generated from a first working coil and a second working coil is formed at the center of an intermediate heating element, and a diameter of the opening is a third length greater than the first length, wherein the first working coil is disposed to be placed at a third height, and the second working coil is disposed to be placed at a fourth height lower than the third height.

According to an embodiment of the present disclosure, an inverter controls the current to flow only through a first working coil when an object to be heated is a magnetic substance, and controls the current to flow only through a second working coil or control the current to flow both of the first working coil and the second working coil when the object to be heated is a non-magnetic substance.

According to an embodiment of the present disclosure, a diameter of an intermediate heating element is a fourth length less than the first length, a first working coil is disposed to be placed at a fourth height, and a second working coil is disposed to be placed at a third height higher than the fourth height.

According to an embodiment of the present disclosure, an inverter controls the current to flow only through a second working coil when an object to be heated is a magnetic substance, and controls the current to flow only through a first working coil or control the current to flow both of the first working coil and the second working coil when the object to be heated is a non-magnetic substance.

Advantageous Effects

According to the present disclosure, since a coil height controller adjusts the height of a working coil, the magnetic field is concentrated to an object to be heated when the object to be heated is a magnetic substance and the magnetic field is concentrated to an intermediate heating element when the object to be heated is a non-magnetic substance, thereby the heating efficiency can be improved regardless of the material of the vessel.

According to the present disclosure, even when it is difficult to install a coil height controller due to the design of a working coil and an intermediate heating element, there is an advantage that the height of the working coil can be adjusted similarly to the case where the coil height controller is provided.

According to the present disclosure, the vertical arrangement of a plurality of working coils varies depending on the diameter of an intermediate heating element and an inverter controls the current to flow through at least one of a plurality of working coils according to the type of an object to be heated, thereby controlling the coupling force of the magnetic field and at the same time preventing the damage of the working coil by the heat from the intermediate heating element.

BEST MODE

Figure 1:
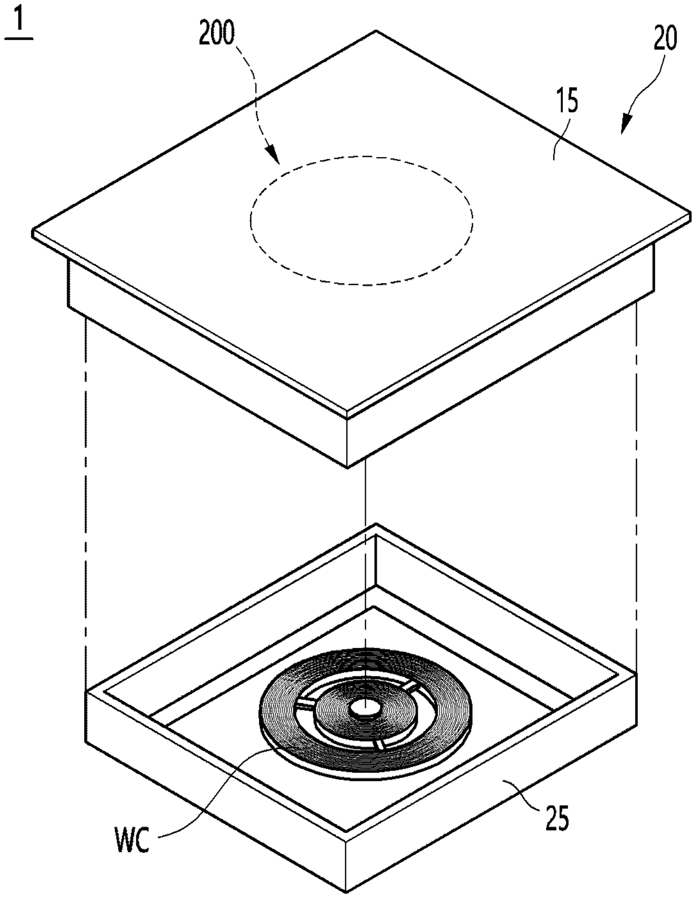
FIG. 1 is a perspective view illustrating a cooking appliance according to a first embodiment of the present disclosure.

Hereinafter, preferred embodiments according to the present disclosure will be described in detail with reference to the accompanying drawings. In the drawings, the same reference numerals are used to refer to the same or similar components.

Hereinafter, a cooking appliance and an operating method thereof according to an embodiment of the present disclosure will be described. Hereinafter, the cooking appliance may be an induction heating type cooktop.

FIG. 1 is a perspective view illustrating a cooking appliance according to a first embodiment of the present disclosure.

Referring to FIG. 1, a cooking appliance 1 may include a case 25, a cover 20, a working coil WC and an intermediate heating element 200.

The case 25 may form the outer appearance of the cooking appliance 1. The case 25 may protect components provided inside the cooking appliance 1 from the outside.

Inside the case 25, the working coil WC, an inverter 140 (see FIG. 2) controlling the current flowing through the working coil WC, and a resonant capacitor (not shown) resonating with the working coil of the working coil WC, a switch (not shown), and the like may be provided. That is, the case 25 may be provided with other components related to driving the working coil WC, which is various devices.

The cover 20 may be combined to an upper side of the case 25 to form the outer appearance of the cooking appliance 1 together with the case 25.

An upper plate 15 on which an object to be heated 100 such as a cooking vessel is placed may be formed on the cover 20. The object to be heated 100 may be disposed on the upper plate 15.

The upper plate 15 may be made of, for example, a glass material (e.g., ceramic glass).

In addition, the upper plate 15 may be provided with an input interface (not shown) that receives an input from a user to transmit the input to a control module (not shown) for an input interface. Of course, the input interface may be provided at a position other than the upper plate 15.

Furthermore, the intermediate heating element 200 may be disposed to be located on the lower surface of the upper plate 15. For example, as indicated by a dotted line in FIG. 1, at least a portion of the intermediate heating element 200 may be disposed at a position overlapping the working coil WC in the vertical direction. On the other hand, this is merely exemplary. That is, the intermediate heating element 200 may be arranged to be located on either the top surface or the inside of the upper plate 15.

The working coil WC may be located beneath the object to be heated 100 and generate a magnetic field for heating the object 100 to be heated. The working coil WC may generate a magnetic field passing through the object to be heated 100 or the intermediate heating element 200 (see FIG. 3) described below. The working coil WC may include a first working coil WC1 (see FIG. 9) and a second working coil WC2 (see FIG. 9). The inverter may control current to flow through one of the first working coil (WC1, see FIG. 9) and the second working coil WC2 (see FIG. 9).

In the cooking appliance 1 according to FIG. 1, when heating the object to be heated 100, which is a magnetic substance, a part of the magnetic field generated from the working coil WC is coupled to the intermediate heating element 200 to indirectly heat the object to be heated 100. Therefore, there is a problem in that heating efficiency is lowered compared to directly heating the object to be heated 100. Accordingly, the present disclosure seeks to improve heating efficiency when heating a magnetic substance by adjusting the height of a working coil.

Figure 2:
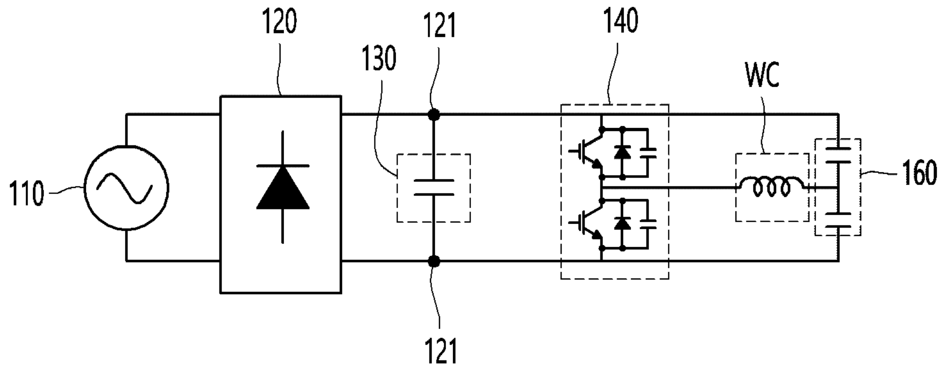
FIG. 2 is a circuit diagram of a cooking appliance according to an embodiment of the present disclosure.

FIG. 2 is a circuit diagram of a cooking appliance according to an embodiment of the present disclosure.

Referring to FIG. 2, the cooking appliance 1 may include at least one of a power supply 110, a rectifier 120, a DC link capacitor 130, an inverter 140, a working coil WC, and a resonance capacitor 160.

The power supply 110 may receive external power. Power received from the outside to the power supply 110 may be alternation current (AC) power.

The power supply 110 may supply an AC voltage to the rectifier 120.

The rectifier 120 is an electrical device for converting alternating current into direct current. The rectifier 120 converts the AC voltage supplied through the power supply 110 into a DC voltage. The rectifier 120 may supply the converted voltage to both DC ends 121.

An output terminal of the rectifier 120 may be connected to both DC ends 121. Both DC ends 121 of the DC output through the rectifier 120 may be referred to as a DC link. A voltage measured at both DC ends 121 is referred to as a DC link voltage.

The DC link capacitor 130 serve as a buffer between the power supply 110 and the inverter 140. For example, the DC link capacitor 130 may be used to maintain the DC link voltage converted through the rectifier 120 and supply the DC link voltage up to the inverter 140.

The inverter 140 serves as a switch for switching the voltage applied to the working coil WC so that high-frequency current flows through the working coil WC.

The inverter 140 may apply current to the working coil WC. The inverter 140 may include a relay or a semiconductor switch that turns on or off the working coil WC.

For example, the inverter 140 may include a semiconductor switch, and the semiconductor switch may be an insulated gate bipolar transistor (IGBT) or a wide band gab (WBG) device. Since this is merely an example, the embodiment is not limited thereto. The WBG device may be silicon carbide (SiC) or gallium nitride (GaN). The inverter 140 drives the semiconductor switch to allow the high-frequency current to flow in the working coil 150, and thus, high-frequency magnetic fields are generated in the working coil 150.

The working coil WC may include at least one working coil WC generating a magnetic field for heating the object to be heated 100.

depending on whether the switching device is driven. When the current flows through the working coil WC, the magnetic fields may be generated. The working coil WC may generate the magnetic fields based on the flow of the current to heat the cooking appliance.

The working coil WC has one side connected to a connection point of the switching device of the inverter 140 and the other side connected to the resonance capacitor 160.

The driving of the switching device may be performed by a driving unit. A high-frequency voltage may be applied to the working coil WC while the switching devices alternately operate under the control of a switching time outputted from the driving unit. Also, since the turn on/off time of the switching device, which is applied from the driving unit, is controlled to be gradually compensated, the voltage supplied to the working coil WC may be converted from a low voltage into a high voltage.

The resonance capacitor 160 may resonant with the working coil of the working coil WC.

The resonance capacitor 160 may be a component to serve as a buffer. The resonance capacitor 160 controls a saturation voltage increasing rate during the turn-off of the switching device to affect an energy loss during the turn-off time.

Figure 3:
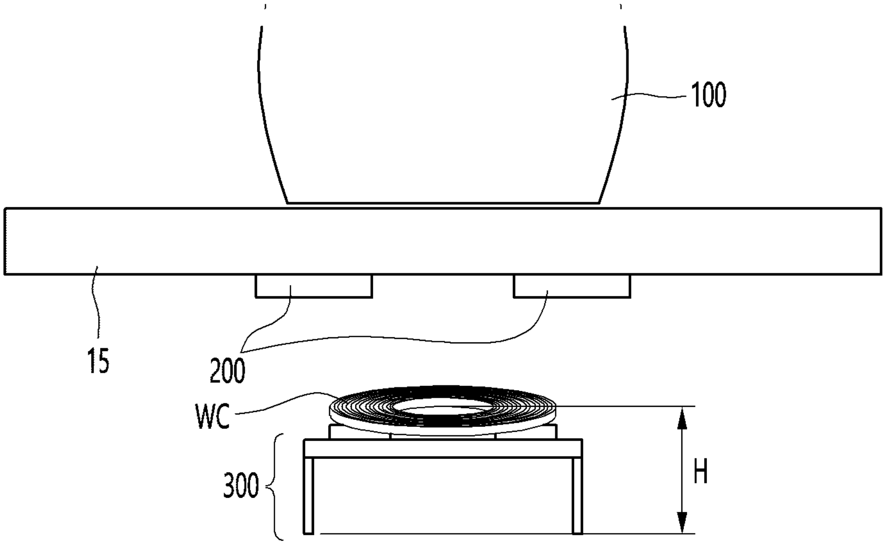
FIG. 3 is a diagram illustrating a cooking appliance according to a second embodiment of the present disclosure.

FIG. 3 is a diagram illustrating a cooking appliance according to a second embodiment of the present disclosure.

The cooking appliance according to the second embodiment of the present disclosure may further include a coil height controller 300.

Referring to FIG. 3, the cooking appliance 1 may include an upper plate 15 on which an object to be heated 100 is placed, an intermediate heating element 200 installed on the upper plate 15, a working coil WC generating a magnetic field passing through the object to be heated 100 or passing through the intermediate heating element 200 and a coil height controller 300 adjusting the height of the working coil WC.

The coil height controller 300 may adjust the height H of the working coil WC. Specifically, the coil height controller 300 may differently adjust the height H of the working coil WC based on the type of the object to be heated 100.

The coil height controller 300 may adjust the distance between the working coil WC and the object to be heated 100 by adjusting the height of the working coil WC. In addition, the coil height controller 300 may adjust the distance between the working coil WC and the intermediate heating element 200 by adjusting the height of the working coil WC.

The coil height controller 300 may adjust a distance between the working coil WC and the object to be heated 100. When the height H of the working coil is higher, the distance between the working coil WC and the heated object 100 becomes closer. When the height H of the working coil is lower, the distance between the working coil WC and the object to be heated 100 can become farther away.

The strength of the magnetic field is represented by the number of lines of magnetic force passing through a unit area, and the smaller the distance between the lines of magnetic force, the stronger the magnetic field. The spacing of the lines of magnetic force widens as they move away from the current-carrying conductor. That is, the farther the magnetic field is located away from the current-carrying wire, the weaker it is. Therefore, the magnetic field coupling force of the object to be heated 100 or the intermediate heating element 200 becomes smaller as it is located farther away from the working coil WC.

Based on this principle, there is an advantage controlling the coupling force of the magnetic field by adjusting the distance between the working coil WC and the heated object 100 or the intermediate heating element 200 through the coil height controller 300 that adjusts the height of the working coil WC.

Figure 4:
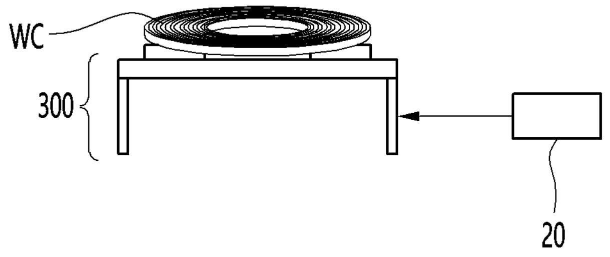
FIG. 4 is a diagram illustrating a coil height controller and a motor that transmits the power to the coil height controller shown in FIG. 3.

FIG. 4 is a diagram illustrating a coil height controller and a motor that transmits the power to the coil height controller shown in FIG. 3.

Referring to FIG. 4, the cooking appliance 1 according to an embodiment of the present disclosure may further include a motor 20 that transmits power to the coil height controller 300.

Since a motor 20 is provided, there are advantages in which the user does not need to manually operate the coil height controller 300 as the coil height controller 300 can automatically adjust the height of the working coil WC. For example, when the user performs an operation of inputting the type of object to be heated 100 into the cooking appliance 1 or when the cooking appliance 1 recognizes the type of object to be heated 100, the coil height controller 300 can automatically adjust the height of the working coil WC by receiving power from the motor 20 according to the type of the object to be heated 100.

The motor 20 may transmit power to the coil height controller 300 so that the height H of the working coil increases when the object to be heated 100 is a magnetic substance. The motor 20 may transmit power to the coil height controller 300 so that the height H of the working coil decreases when the object to be heated 100 is a non-magnetic substance.

Although FIG. 4 shows an embodiment in which the motor 20 is provided outside the coil height controller 300, the present invention is not limited thereto, and also include an embodiment that the motor 20 is provided inside the coil height controller 300.

Meanwhile, the motor 20 is just an example, and the coil height controller 300 may receive power from a power device other than the motor 20.

Figure 5:
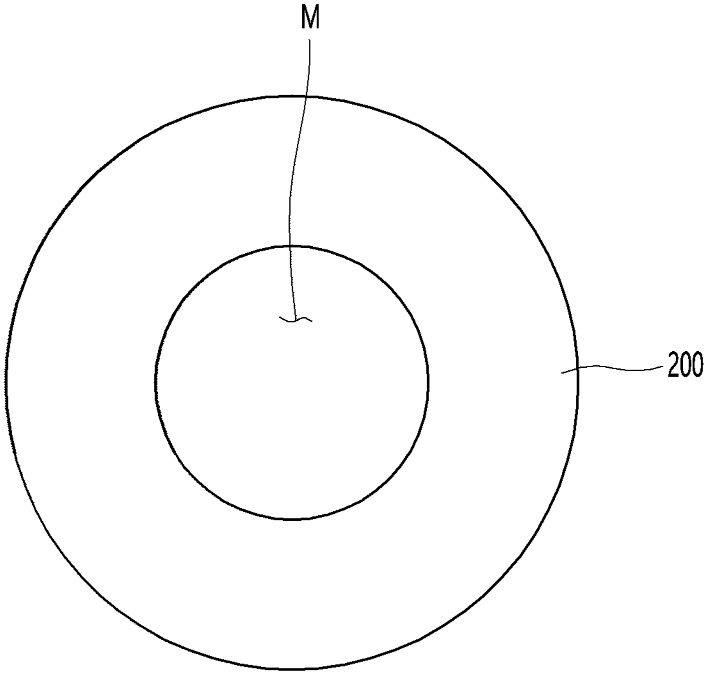
FIG. 5 is a cross-sectional view in a horizontal direction of the intermediate heating element shown in FIG. 3.

FIG. 5 is a cross-sectional view in a horizontal direction of the intermediate heating element shown in FIG. 3.

A horizontal cross section of the intermediate heating element 200 may have a shape having at least one closed loop. In addition, a horizontal cross section of the intermediate heating element 200 may have a shape in which at least one closed loop is formed. That is, an opening M through which a magnetic field generated from the working coil WC can pass may be formed at the center of the intermediate heating element 200.

Therefore, the magnetic field generated from the working coil WC passes through the opening M and is directly coupled to the object to be heated 100 to generate heat, or coupled to the intermediate heating object 200 to indirectly heat the object 100 to be heated.

The cooking appliance 1 according to the embodiment of the present disclosure applies current to the plurality of working coils WC having different heights according to the type of the object to be heated 100, thereby current may be selectively applied to the plurality of working coils WC according to the type of the object to be heated 100 as described below. Accordingly, the magnetic field concentration region may be adjusted to the object to be heated 100 or the intermediate heating object 200 according to the type of the object to be heated 100.

That is, the present disclosure has an advantage in that the magnetic field concentration region can be adjusted by forming the opening M in the intermediate heating element 200, and thus the heating efficiency is improved according to the type of the object to be heated 100.

Figure 6:
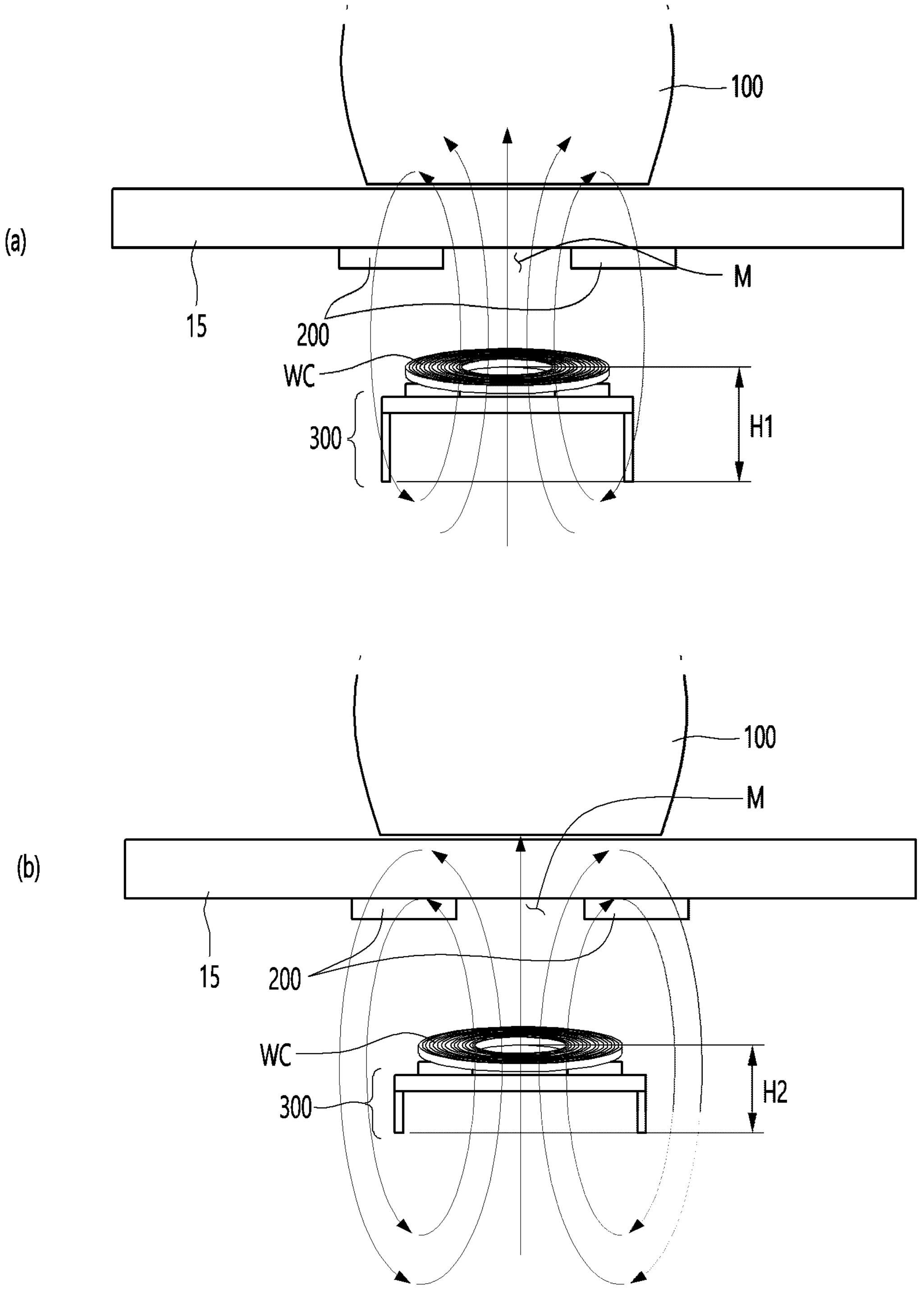
FIG. 6 is a diagram in which the coil height controller shown in FIG. 3 adjusts the height of the working coil according to the type of object to be heated.

FIG. 6 is a diagram in which the coil height controller shown in FIG. 3 adjusts the height of the working coil according to the type of object to be heated.

In FIG. 6, (a) is a diagram showing a shape in which the coil height controller adjusts the height of the working coil to a first height when the object to be heated is a magnetic substance, and, in FIG. 6, (b) is a diagram showing a shape in which the coil height controller adjusts the height of the working coil to a second height when the object to be heated is a non-magnetic substance.

Referring to (a) of FIG. 6, when the object to be heated 100 is a magnetic substance, the coil height controller 300 adjusts the height of the working coil WC to a first height H1. Further, referring to (b) of FIG. 6, when the object to be heated 100 is a non-magnetic substance, the coil height controller 300 adjusts the height of the working coil WC to a second height H2 lower than the first height H1.

Referring back to (a) of FIG. 6, when the object to be heated 100 is a magnetic substance and when the height of the working coil WC is the first height H1, the distance between the working coil WC and the object to be heated is closer than when the height of the working coil WC is the second height H2.

In FIG. 6, (a) is an exemplary diagram illustrating a magnetic field formed when a current flows through the working coil WC. As shown, when the height of the working coil WC is the first height H1, a magnetic field passing through an opening M formed at the center of the intermediate heating element 200 may be greater than a magnetic field reaching the intermediate heating element 200, among a magnetic field generated from the working coil WC. Accordingly, the magnetic field coupled to the object to be heated 100 may be greater than the magnetic field coupled to the intermediate heating element 200, among the magnetic fields generated by the working coil WC. That is, the coil height controller 300 may improve the heating efficiency by setting the height of the working coil WC to be the first height H1 to concentrate the magnetic field to the object to be heated 100 rather than the intermediate heating element 200.

On the other hand, referring back to (b) of FIG. 6, when the object to be heated 100 is a non-magnetic substance and when the height of the working coil WC has the second height H2, the distance between the working coil WC and the intermediate heating element 200 may be further than when the height of the working coil WC is the first H1.

FIG. 6B is an exemplary diagram illustrating a magnetic field formed when a current flows through the working coil WC. As shown, when the height of the working coil WC is the first height H2, a magnetic field that reaching the intermediate heating element 200 may be greater than a magnetic field passing through an opening M formed at the center of the intermediate heating element 200, among a magnetic field generated from the working coil WC. Accordingly, the magnetic field coupled to the intermediate heating element 200 may be greater than the magnetic field coupled to the object to be heated 100, among the magnetic fields generated by the working coil WC. That is, the coil height controller 300 may improve the heating efficiency by setting the height of the working coil WC to be the second height H2 to concentrate the magnetic field to the intermediate heating element 200 rather than the object to be heated 100. Meanwhile, when the distance between the working coil WC and the intermediate heating element 200 is too short, the intermediate heating substance 200 may overheat and damage the working coil WC. In addition, when the object to be heated 100 is a non-magnetic substance, the magnetic field generated from the working coil WC is hardly coupled to the object to be heated 100, and thus may not need to reach the object to be heated 100. Therefore, the coil height controller 300 allowing the height of the working coil WC to have the second height H2, the damage caused by heat from the intermediate heating element 200 of the working coil WC may be minimized. At the same time the magnetic field generated from the working coil WC may be coupled to the intermediate heating element 200 as much as possible.

Therefore, the present disclosure may adjust the magnetic field concentration region by utilizing the principle that when the height of the working coil WC is high, there is a large magnetic field passing through the opening M before coupling with the intermediate heating element 200, and when the height of the working coil WC is low, the magnetic field couples with the intermediate heating element 200 before passing through the opening M.

Figure 7:
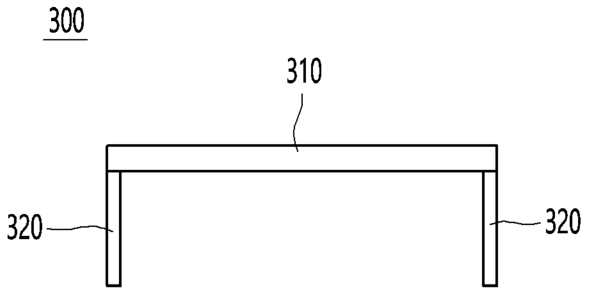
FIG. 7 is a diagram illustrating detailed configuration of a coil height controller according to an embodiment of the present disclosure.

FIG. 7 is a diagram illustrating detailed configuration of a coil height controller according to an embodiment of the present disclosure.

Referring to FIG. 7, the coil height controller 300 may include a supporter 310 that supports the working coil and an elevator 320 that lifts the supporter.

The supporter 310 may be made of aluminum, but since this is merely an example, it is appropriate that it is not limited thereto. The supporter 310 may be made of any material having a certain hardness on which an object such as the working coil WC may be placed.

The supporter 310 may be a plate. The supporter 310 may have any shape capable of placing an object such as the working coil WC.

The elevator 320 may be disposed below the supporter 310 to support the supporter 310. The elevator 320 may raise or lower the supporter 310. For example, the height of the working coil WC supported by the supporter 310 may be adjusted by adjusting the length of the elevator 320.

Although not shown in the drawings, according to another embodiment of the present disclosure, the coil height controller 300 may include the supporter 310 supporting the working coil, the elevator 320 elevating the supporter 310, and may further include a fastener (not shown) combining the elevator 320 and the supporter 310 such as a screw.

In addition, the coil height controller 300 may further include an elastic element, which will be described with reference to FIG. 8.

Figure 8:
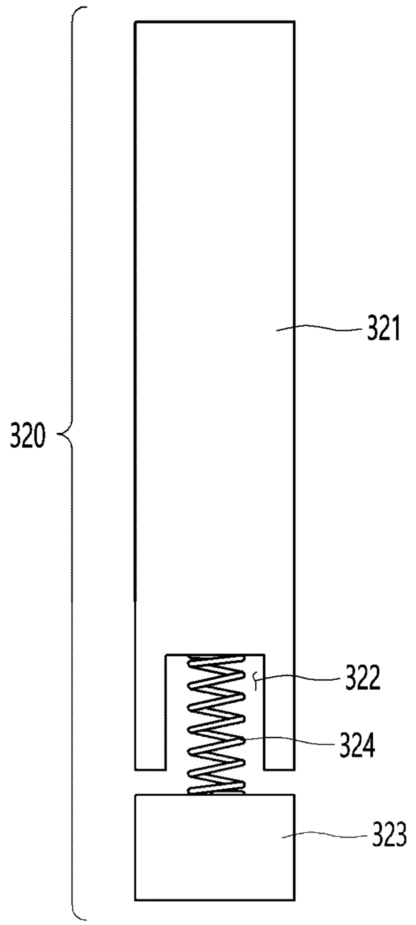
FIG. 8 is a diagram illustrating detailed configuration of an elevator of a coil height controller according to an embodiment of the present disclosure.

FIG. 8 is a diagram illustrating detailed configuration of an elevator of a coil height controller according to an embodiment of the present disclosure.

Referring to FIG. 8, the elevator 320 may include a supporting leg 321 combined to a supporter 310, an accommodation groove 322 in which an elastic element 324 is accommodated is formed inside the lower end of the supporting leg, and a support end 323 installed on the lower side of the supporting leg to support the supporting leg.

The supporter 310 may be placed on or combined to the upper portion of the supporting leg 321. The height of the supporter 310 may be adjusted while the height of the supporting leg 321 is adjusted. That is, the height of the working coil WC placed on the supporter 310 may be adjusted.

The accommodation groove 322 in which the elastic element 324 is accommodated may be formed inside the lower end of the supporting leg 321. The receiving groove 322 may have a cup shape. The accommodating groove 322 may have any shape formed to accommodate the elastic member 324 inside the supporting leg 321.

The support end 323 may support the supporting leg 321 at the lower portion of the supporting leg 321. The support end 323 may have a block shape. The support end 323 may have any shape capable of supporting the supporting leg 321.

The elastic element 324 may be a coil spring. The elastic element 324 may be any object having an elastic force. The elastic element 324 may be disposed between the accommodation groove 322 formed in the supporting leg 321 and the supporting end 323. That is, the length of the elevator 320 may be adjusted while the length of the elastic element 324 is adjusted according to the pressure applied to the elastic element 324. Accordingly, the height of the supporter 310 may be adjusted, and the height of the working coil WC placed on the supporter 310 may be adjusted.

In this way, when the elevator 320 includes the elastic element 324, the elastic element 324 is a relatively easy-to-get element, and the length of the elevator 320 can be adjusted simply by adjusting the pressure applied to the elastic element 324, which is advantageous in manufacturing and design.

Although not shown in the drawings, according to another embodiment of the present disclosure, the elevator 320 includes two supporting legs 321, and further include a hinge (not shown) in the middle of each two supporting legs 321 combining the two supporting legs 321 to form a pair of supporting leg 321. As the pair of supporting legs 321 rotates around the hinge (not shown), the height of the working coil WC may be adjusted as the angle of the upper or lower end of the pair of supporting legs 321 increases or decreases. In addition, according to another embodiment of the present disclosure, the elevator 320 includes four supporting legs 321, and further include a hinge (not shown) in the middle of each four supporting legs 321 combining the two supporting legs 321 to form two pairs of supporting leg 321. Two pairs of supporting leg 321 may be combined to opposite sides of the lower surface of the supporter 310. As two pairs of supporting legs 321 rotates around the hinge (not shown), the height of the working coil WC may be adjusted as the angle of the upper or lower end of the pair of supporting legs 321 increases or decreases.

The elevator 310 of the present disclosure is not limited to the above-described embodiment, and may include all structures having a height adjustment function.

Meanwhile, the cooking appliance 1 according to a third embodiment of the present invention may include a plurality of working coils WC located at different heights. In this case, the cooking appliance 1 may not include a coil height controller 300.

Figure 9:
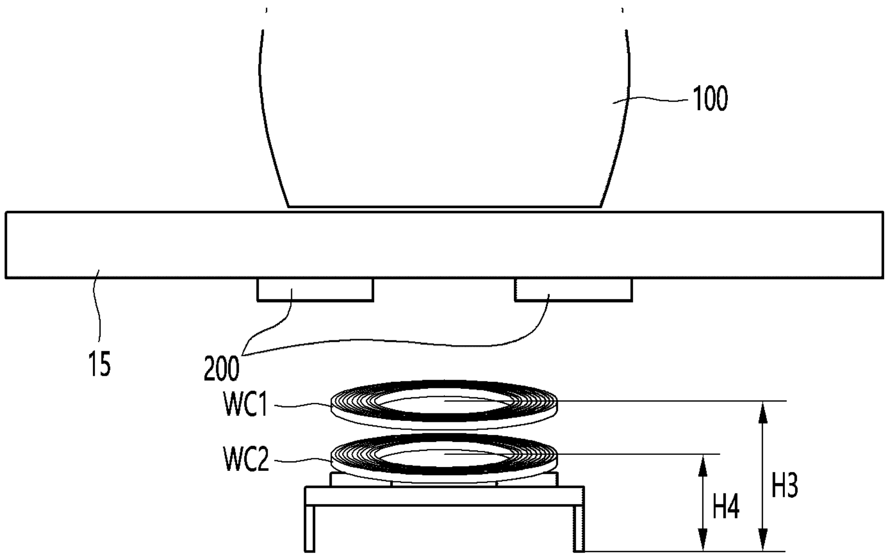
FIG. 9 is a diagram illustrating a cooking appliance according to a third embodiment of the present invention.

FIG. 9 is a diagram illustrating a cooking appliance according to a third embodiment of the present invention.

According to the third embodiment, the cooking appliance 1 may include an intermediate heating element 200 with an opening through which a magnetic field generated from the working coil can pass in the center, and at least a first working coil and a second working coil disposed at different heights.

Specifically, the cooking apparatus 1 may include an upper plate 15 on which an object to be heated 100 is placed, an intermediate heating element 200 installed on the upper plate 15, a first working coil WC1 a second working coil WC2 generating a magnetic field passing through the object to be heated 100 or passing through the intermediate heating element 200 and an inverter 140 (see FIG. 2) controlling the current flowing through the first working coil WC1 and the second working coil. The first working coil WC1 and the second working coil WC2 may be placed at the different height. For example, the first working coil WC1 may be disposed at a third height H3, and the second working coil WC2 may be disposed at a fourth height H4 lower than the third height. As described above in FIG. 6, the magnetic field concentrated region can be adjusted to the object to be heated 100 or the intermediate heating element 200 according to the height of the working coil WC.

Therefore, by selectively allowing current to flow through a plurality of working coils WC of different heights, the magnetic field concentration region can be adjusted according to the type of the object to be heated. In addition, when multiple working coils WC are disposed at different heights, the coil height controller 300 is unnecessary, and accordingly, the structure inside the cooking appliance 1 may be simplified. In more detail, even when it is difficult to install the coil height controller 300 due to the design of the cooking appliance 1, there is an advantage that the height of the working coil WC may be adjusted similarly to the case where the coil height controller 300 is provided.

Meanwhile, in FIG. 9 and FIGS. 10 and 11 which will be described later, the first and second working coils WC1, WC2 may be supported by a pedestal or the like.

Figure 10:
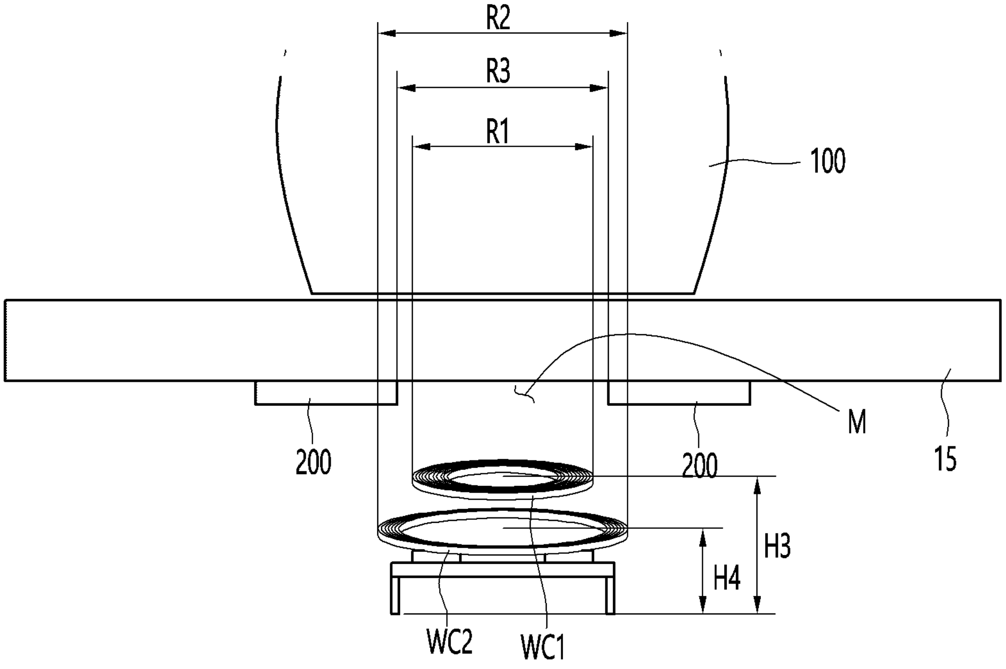
FIG. 10 is a diagram illustrating a disposition of a first working coil and a second working coil according to a diameter of an intermediate heating element according to an embodiment of the present disclosure.

FIG. 10 is a diagram illustrating a disposition of a first working coil and a second working coil according to a diameter of an intermediate heating element according to an embodiment of the present disclosure.

First, referring to FIG. 10, the diameter of the first working coil WC1 may have a first length R1, and the diameter of the second working coil WC2 may have a second length R2 greater than the first length R1. At this time, the opening M through which magnetic fields generated from the first and the second working coils WC1, WC2 can pass may be formed at the center of the intermediate heating element 200. At this time, the diameter of the opening M formed at the center of the intermediate heating element 200 may have a third length R3 greater than the first length R1. The relationship between the first length R1, the second length R2, and the third length R3 is exemplary for maximizing the heating efficiency of the object to be heated 100 according to an embodiment of the present disclosure. As such, even if the magnitude relationship of each length is different in the range in which the magnetic field generated from the first working coil WC1 and the second working coil WC2 can reach the intermediate heating element 200 or can pass through the opening M formed at the center of the intermediate heating element 200 thereby can reach the object to be heated, it does not deviate from the scope of the present invention. For example, the first length R1 and the second length R2 may have the same length or different lengths. Also, for example, the third length R3 may have the same length as or a different length from the first length R1. Meanwhile, the first working coil WC1 may be disposed higher than the second working coil WC2. For example, the first working coil WC1 may be disposed at a third height H3, and the second working coil WC2 may be disposed at a fourth height H4 lower than the third height.

The inverter 140 (see FIG. 2) may control the current to flow only through the first working coil WC1 when the object to be heated 100 is a magnetic substance. In addition, the inverter 140 (see FIG. 2) may control the current to flow only through the second working coil WC2 or to flow through both of the first working coil WC1 and the second working coil WC2 when the object to be heated 100 is a non-magnetic substance.

When the object to be heated 100 is a magnetic substance, the current may flow only in the first working coil WC1, and in this case, the magnetic field is concentrated to the object to be heated 100 rather than the intermediate heating element 200 by passing through the opening M formed in the center of the intermediate heating element 200.

On the other hand, when the object to be heated 100 is a non-magnetic substance, the current may flow only in the second working coil WC2, and in this case, the magnetic field may be concentrated to the intermediate heating element 200 rather than the object to be heated 100. Meanwhile, when the object to be heated 100 is a non-magnetic substance, the current may flow through both of the first working coil WC1 and the second working coil WC2. In the case of heating the object to be heated 100 only with the magnetic field generated by the second working coil WC2, the number of windings of the second working coil WC2 may be designed to be large. As current flows in both the first working coil WC1 and the second working coil WC2, the magnetic field can be concentrated on the intermediate heating element 200. At the same time, there is an advantage of the number of windings of the second working coil WC2 does not need to be increased.

In addition, when heating magnetic substance, since the magnetic field is generated from the first working coil WC1 disposed at the third height H3 higher than the fourth height H4, more magnetic field reaches the object to be heated 100 by passing through the opening M at the center of the intermediate heating element 200 than when the first working coil WC1 is disposed at the fourth height H4. In addition, power of the cooking appliance 1 can be efficiently used by allowing current to flow only through the first working coil WC1.

On the other hand, when heating non-magnetic substance, since the magnetic field is generated from the second working coil WC2 disposed at the fourth height H4 lower than the second height H3, damage to the working coil WC by the heat from the intermediate heat element 200 can be prevented by maintaining the distance between the second working coil WC2 and the intermediate heating element 200 at a certain distance or more.

Figure 11:
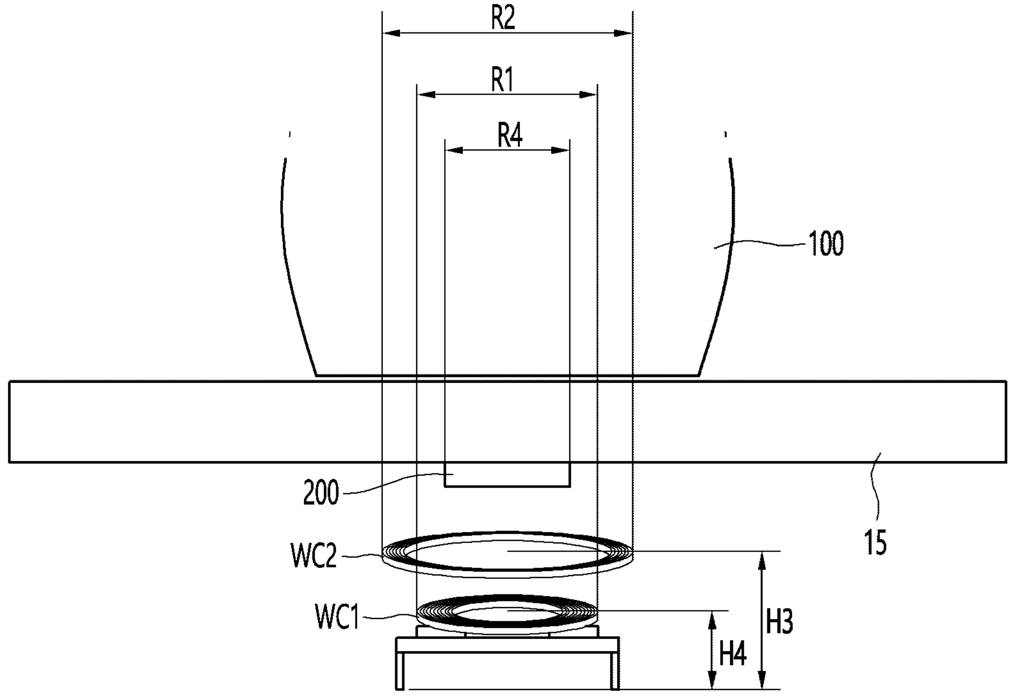
FIG. 11 is a diagram illustrating a disposition of a first working coil and a second working coil according to a diameter of an intermediate heating element according to another embodiment of the present disclosure.

FIG. 11 is a diagram illustrating a disposition of a first working coil and a second working coil according to a diameter of an intermediate heating element according to another embodiment of the present disclosure.

Next, referring to FIG. 11, the diameter of the first working coil WC1 may have a first length R1, and the diameter of the second working coil WC2 may have a second length R2 greater than the first length R1. In this case, the diameter of the intermediate heating element 200 may have a fourth length R4 less than the first length R1, and the first working coil WC1 may be disposed lower than the second working coil WC2. This relationship between the first length R1, the second length R2, and the fourth length R4 is an example for maximizing the heating efficiency of the object 100 to be heated according to an embodiment of this disclosure. As such, even if the magnitude relationship of each length is different in the range in which the magnetic field generated from the first working coil WC1 or the second working coil WC2 can reach the intermediate heating element 200 or can pass through the periphery of the intermediate heating element 200 thereby can reach the object to be heated, it does not deviate from the scope of the present invention. For example, the first length R1 and the second length R2 may have the same length or different lengths. In addition, for example, the fourth length R4 may have the same length as the first length R1 or a different length.

Meanwhile, the first working coil WC1 may be disposed at a fourth height, and the second working coil WC2 may be disposed at a third height H3 higher than the fourth height H4.

The inverter 140 (see FIG. 2) may control the current to flow only through the second working coil WC2 when the object to be heated 100 is a magnetic substance. In addition, the inverter 140 (see FIG. 2) may control the current to flow only through the first working coil WC1 or to flow through both of the first working coil WC1 and the second working coil WC2 when the object to be heated 100 is a non-magnetic substance.

A magnetic field passing through the periphery of the intermediate heating element 100 and reaching the object to be heated 100 among the magnetic fields generated from the second working coil WC2 may be larger when the second length R2 is greater than the fourth length R4 than when the second length R2 is smaller than the fourth length R4.

In addition, a magnetic field reaching the intermediate heating element 200 among a magnetic field generated from the first working coil WC1 may be larger when the first length R1 is less than the fourth length R4 than when the first length R1 is greater than the fourth length R4.

When the object to be heated 100 is a magnetic substance, the current may flow only in the second working coil WC2, and in this case, the magnetic field is concentrated to the object to be heated 100 rather than the intermediate heating element 200 by passing through the periphery of the intermediate heating element 200.

On the other hand, when the object to be heated 100 is a non-magnetic substance, the current may flow only in the first working coil WC1, and in this case, the magnetic field may be concentrated to the intermediate heating element 200 rather than the object to be heated 100. Meanwhile, when the object to be heated 100 is a non-magnetic substance, the current may flow through both of the first working coil WC1 and the second working coil WC2. In the case of heating the object to be heated 100 only with the magnetic field generated by the first working coil WC1, the number of windings of the first working coil WC1 may be designed to be large. As current flows in both the first working coil WC1 and the second working coil WC2, the magnetic field can be concentrated on the intermediate heating element 200. At the same time, there is an advantage of the number of windings of the first working coil WC1 does not need to be increased.

In addition, when heating magnetic substance, since the magnetic field is generated from the second working coil WC2 disposed at the third height H3 higher than the fourth height H4, more magnetic field reaches the object to be heated 100 by passing through the opening M at the center of the intermediate heating element 200 than when the second working coil WC2 is disposed at the fourth height H4. In addition, power of the cooking appliance 1 can be efficiently used by allowing current to flow only through the second working coil WC2.

On the other hand, when heating non-magnetic substance, since the magnetic field is generated from the first working coil WC1 disposed at the fourth height H4 lower than the second height H3, damage to the working coil WC by the heat from the intermediate heat element 200 can be prevented by maintaining the distance between the second working coil WC2 and the intermediate heating element 200 at a certain distance or more.

The above description is merely illustrative of the technical spirit of the present disclosure, and various modifications and variations will be possible without departing from the essential characteristics of the present disclosure by those of ordinary skill in the art to which the present disclosure pertains.

Accordingly, the embodiments disclosed in the present disclosure are for explanation rather than limiting the technical spirit of the present disclosure, and the scope of the technical spirit of the present disclosure is not limited by these embodiments.

The protection scope of the present disclosure should be interpreted by the following claims, and all technical ideas within the scope equivalent thereto should be construed as being included in the scope of the present disclosure.

What is claimed is:

1. A cooking appliance comprising:

an upper plate configured to support an object to be heated;

an intermediate heating element located at the upper plate;

a working coil configured to generate a magnetic field passing through at least one of the object to be heated and the intermediate heating element;

an inverter configured to control a current flowing through the working coil; and a coil height adjustor configured to adjust a height of the working coil, wherein the coil height adjustor is configured to adjust a position of the working coil relative to the intermediate heating element so as to be closer to the intermediate heating element when the object to be heated is a magnetic material and to be further from the intermediate heating element when the object to be heated is a non-magnetic material.

2. The cooking appliance of claim 1, wherein the coil height adjustor is configured to adjust the height of the working coil based on a type of the object to be heated.

3. The cooking appliance of claim 1, wherein the coil height adjustor is configured to adjust a distance between the working coil and the intermediate heating element.

4. The cooking appliance of claim 1, further comprising a motor configured to transmit power to the coil height adjustor.

5. The cooking appliance of claim 1, wherein the intermediate heating element has at least one closed loop.

6. The cooking appliance of claim 1, wherein the coil height adjustor comprises:

a supporter configured to support the working coil; and a lifter configured to lift the supporter.

7. The cooking appliance of claim 6, wherein the lifter comprises:

a supporting leg connected to the supporter;

an accommodation groove in a lower end of the supporting leg; and an elastic element located in the accommodation groove.

8. The cooking appliance of claim 7, wherein the lifter further comprises a support end located at the lower end of the supporting leg to support the supporting leg.

9. The cooking appliance of claim 8, wherein elastic member is located between the lower end of the supporting leg and the support end.

10. A cooking appliance comprising:

an upper plate configured to support an object to be heated;

an intermediate heating element located at the upper plate;

a first working coil configured to generate a magnetic field passing through at least one of the object to be heated and the intermediate heating element;

a second working coil configured to generate a magnetic field passing through at least one of the object to be heated and the intermediate heating element, the second working coil being located at a different height than the first working coil relative to the intermediate heating element; and an inverter configured to control a current to flow through at least one of the first working coil and the second working coil, wherein an outer diameter of the first working coil is a first length, wherein an outer diameter of the second working coil is a second length that is greater than the first length, wherein an opening, through which at least a portion of the magnetic field generated from the first working coil or the second working coil passes, is located at the center of the intermediate heating element, a diameter of the opening being a third length that is greater than the first length, wherein the first working coil is located further from the intermediate heating element than the second working coil is located to the intermediate heating element, wherein, when the object to be heated is a magnetic substance, the inverter is configured to control the current to flow only through the first working coil, and wherein, when the object to be heated is a non-magnetic substance, the inverter is configured to control the current to flow only through the second working coil or to control the current to flow through both of the first working coil and the second working coil.

11. The cooking appliance of claim 10, wherein the third length is less than the second length.

12. A cooking appliance comprising:

an upper plate configured to support an object to be heated;

an intermediate heating element located at the upper plate;

a first working coil configured to generate a magnetic field passing through at least one of the object to be heated and the intermediate heating element;

a second working coil configured to generate a magnetic field passing through at least one of the object to be heated and the intermediate heating element, the second working coil being located at a different height than the first working coil relative to the intermediate heating element; and an inverter configured to control a current to flow through at least one of the first working coil and the second working coil, wherein an outer diameter of the first working coil is a first length, wherein an outer diameter of the second working coil is a second length that is greater than the first length,.

wherein an outer diameter of the intermediate heating element is a third length that is less than the first length, wherein the first working coil is located closer to the intermediate heating element than the second working coil is located to the intermediate heating element, wherein, when the object to be heated is a magnetic substance, the inverter is configured to control the current to flow only through the second working coil, and wherein, when the object to be heated is a non-magnetic substance, the inverter is configured to control the current to flow only through the first working coil or to control the current to flow through both of the first working coil and the second working coil.

* * * * *